US012611703B2

(12) United States Patent
Wang et al.

(10) Patent No.: US 12,611,703 B2
(45) Date of Patent: Apr. 28, 2026

(54) DEVICE AND METHOD FOR DESALINATION AND SALT CONTROL OF LAKE OR RESERVOIR EMBANKMENT

(71) Applicant: Shanghai Investigation, Design & Research Institute Co., Ltd., Shanghai (CN)

(72) Inventors: Penghe Wang, Shanghai (CN); Zhu Li, Shanghai (CN); Xinying Yu, Shanghai (CN); Weiwei Wu, Shanghai (CN)

(73) Assignee: Shanghai Investigation, Design & Research Institute Co., Ltd., Shanghai (CN)

( * ) Notice: Subject to any disclaimer, the term of this patent is extended or adjusted under 35 U.S.C. 154(b) by 0 days.

(21) Appl. No.: 18/574,338

(22) PCT Filed: Aug. 10, 2023

(86) PCT No.: PCT/CN2023/112133
§ 371 (c)(1),
(2) Date: Apr. 2, 2024

(87) PCT Pub. No.: WO2024/244164
PCT Pub. Date: Dec. 5, 2024

(65) Prior Publication Data
US 2026/0070102 A1     Mar. 12, 2026

(30) Foreign Application Priority Data

May 31, 2023    (CN) ......................... 202310628666.0

(51) Int. Cl.
B09C 1/02        (2006.01)
B08B 3/04        (2006.01)
(Continued)

(52) U.S. Cl.
CPC .................. B09C 1/02 (2013.01); B08B 3/04 (2013.01); B09C 1/06 (2013.01); F26B 3/20 (2013.01); B09C 2101/00 (2013.01)

(58) Field of Classification Search
CPC ......... B09C 1/02; B09C 1/06; B09C 2101/00; B08B 3/04; F26B 3/20
See application file for complete search history.

(56) References Cited

U.S. PATENT DOCUMENTS 10,456,780 B1    10/2019  Al-Sulaiman et al.
10,835,938 B1 *  11/2020  Lu ............................ B09C 1/02
12,492,523 B2 *  12/2025  Hu .......................... E02B 1/003

FOREIGN PATENT DOCUMENTS

CN        104145552 A    11/2014
CN        105766125 Y     7/2016
(Continued)

OTHER PUBLICATIONS

Wang, Penghe et al., Scheme design of ecological purification system in front of a reservoir in a coastal area, Jilin Water Resources, Mar. 31, 2022, pp. 37-42, vol. 3, China Academic Journal Electronic Publishing House, CN.
(Continued)

*Primary Examiner* — Janine M Kreck
(74) *Attorney, Agent, or Firm* — The Inventor's Friend Patent Law Firm, P.L.L.C.; Nathaniel A. Wickliffe

(57)        ABSTRACT
A soil desalination and salt control apparatus and method for a bank of a lake reservoir are provided. The apparatus includes a soil washing system and an auxiliary heating evaporation system; the soil washing system includes a desalination fabric laid on a surface of soil in a to-be-desalinated area, a washing pipeline set on the desalination fabric, and a washing water source connected to the washing pipeline. Washing holes are provided on a lower end side of the washing pipeline towards the desalination fabric. The
(Continued)

auxiliary heating evaporation system includes an auxiliary heating circulation pipeline buried inside the soil of the to-be-desalinated area, and a heat source assembly and an auxiliary heating control system both connected to the auxiliary heating circulation pipeline. The burial depth of the auxiliary heating circulation pipeline is the desalination control depth of soil of the bank of the lake reservoir.

7 Claims, 4 Drawing Sheets

(51) Int. Cl.
B09C 1/06 (2006.01)
F26B 3/20 (2006.01)

(56) References Cited

FOREIGN PATENT DOCUMENTS

| CN | 205694139 | Y | 11/2016 |
|----|-----------|---|---------|
| CN | 106269835 | A | 1/2017 |
| CN | 106703052 | A | 5/2017 |
| CN | 206296301 | A | 7/2017 |
| CN | 107889571 | Y | 4/2018 |
| CN | 108391563 | Y | 8/2018 |
| CN | 208643667 | A | 3/2019 |
| CN | 109673193 | A | 4/2019 |
| CN | 110050537 | A | 7/2019 |
| CN | 110252789 | A | 9/2019 |
| CN | 110495277 | A | 11/2019 |
| CN | 112517624 | A | 3/2021 |
| CN | 112620324 | A | 4/2021 |
| CN | 115589804 | A | 1/2023 |
| CN | 116351859 |   | 6/2023 |
| JP | 7080431   | A | 6/2022 |

OTHER PUBLICATIONS

Wu, Weiwei et al., Study on the control effect of desalted soil in-situ covering method on soil chloride ion release, Environmental Engineering, May 30, 2023, pp. 456-459, vol. 41, No. S1, China Academic Journal Electronic Publishing House, CN.

* cited by examiner

DEVICE AND METHOD FOR DESALINATION AND SALT CONTROL OF LAKE OR RESERVOIR EMBANKMENT

TECHNICAL FIELD

The present disclosure relates to the technical field of saline-alkali soil improvement, especially to a soil desalination and salt control apparatus for a bank of a lake reservoir, and a soil desalination and salt control method for a bank of a lake reservoir using the apparatus.

BACKGROUND

Coastal areas generally have high salinity in soil and river and lake waters, and the lack of quality freshwater resources often becomes a major limiting factor for the development of industrial and agricultural production in the region. It also brings many inconveniences to the lives of local residents, thereby affecting the long-term development of the region. Therefore, the construction of water sources is an important measure to promote the sustained and positive development of the economy and society in coastal areas. However, the constructed new reservoirs in coastal areas face the pressure of continuous release of chloride ions from the soil and surface pollutants carried by rainfall runoff that threaten the water quality safety of the reservoirs. Therefore, soil desalination and salt control in the reservoir area have become necessary to ensure the stability of the water quality in the reservoirs.

Currently, the disclosed soil desalination processes are mainly aimed at the improvement of farmland soil and are not suitable for the soil desalination and salt control of the bank of lake reservoirs. In addition, many soil desalination methods require the addition of chemicals or other amendment materials to the soil, which does not conform to the concept of ecological and environmental protection and can easily pose hidden dangers to the water quality safety of lakes and reservoirs.

SUMMARY

The present disclosure provides a soil desalination and salt control apparatus for a bank of a lake reservoir, which is suitable for desalination and salt control of various high-salinity soil substrates on banks of lake reservoirs in coastal areas.

The apparatus includes a soil washing system and an auxiliary heating evaporation system; the soil washing system includes a desalination fabric laid on a surface of soil in a to-be-desalinated area, a washing pipeline set on the desalination fabric, and a washing water source connected to the washing pipeline; a plurality of washing holes is arranged on a lower end side of the washing pipeline, facing towards the desalination fabric. The auxiliary heating evaporation system includes an auxiliary heating circulation pipeline buried inside the soil of the to-be-desalinated area, as well as a heat source assembly and an auxiliary heating control system both connected to the auxiliary heating circulation pipeline; a burial depth of the auxiliary heating circulation pipeline is a desalination control depth of soil of the bank of the lake reservoir.

Further, the soil washing system further includes a water diversion assembly; the washing pipeline is connected to the washing water source through the water diversion assembly.

Further, the washing pipeline includes a plurality of parallel washing branch pipelines, a first main pipeline connected to one end of each of the plurality of washing branch pipelines, and a second main pipeline connected to the first main pipeline; wherein the plurality of washing branch pipelines is located on an upper side of the desalination fabric, and each of the plurality of washing branch pipelines is provided with the plurality of washing holes; wherein the second main pipeline is detachably connected to the water diversion assembly.

Further, the auxiliary heating circulation pipeline includes a plurality of evaporative branch pipelines arranged side by side, a first auxiliary heating main pipeline connected to one end of each of the plurality of evaporative branch pipelines, a second auxiliary heating main pipeline connected to the other end of each of the plurality of evaporative branch pipelines, and an auxiliary heating connection pipeline connected between the first auxiliary heating main pipeline and the second auxiliary heating main pipeline; wherein the plurality of evaporative branch pipelines is buried within the soil of the to-be-desalinated area, and the auxiliary heating connection pipeline is detachably connected with the heat source assembly and the auxiliary heating control system.

Further, the heat source assembly is a water heating and storing tank.

Further, the soil desalination and salt control apparatus for the bank of the lake reservoir further includes a thermal insulation pad layer laid between the auxiliary heating circulation pipeline and a bottom soil layer of the to-be-desalinated area.

The present disclosure further provides a soil desalination and salt control method for a bank of a lake reservoir, using the above soil desalination and salt control apparatus. The method includes:

S1, plowing and leveling topsoil of the to-be-desalinated area according to a preset desalination control depth of the soil of the bank of the lake reservoir, and forming a plurality of interconnected drainage ditches on the topsoil of the to-be-desalinated area;

S2, assembling the soil washing system and the auxiliary heating evaporation system in the to-be-desalinated area, burying the auxiliary heating circulation pipeline inside the soil of the to-be-desalinated area so that a top of the auxiliary heating circulation pipeline is flush with a bottom of the plurality of drainage ditches; laying the desalination fabric on a surface of the soil in the to-be-desalinated area, and disposing the washing pipeline on the desalination fabric;

S3, starting the soil washing system: introducing water into the washing pipeline by the washing water source, wherein the water flows into the to-be-desalinated area through the plurality of washing holes and the desalination fabric, and implementing uninterrupted washing for a fixed duration on the to-be-desalinated area according to a set water distribution flow rate; after the washing is finished, closing the soil washing system, and removing the washing pipeline;

S4, starting the auxiliary heating evaporation system: introducing a heat medium into the auxiliary heating circulation pipeline by the heat source assembly, wherein the heat medium circulates and flows within the auxiliary heating circulation pipeline, and implementing auxiliary heating evaporation on the to-be-desalinated area; when a soil moisture content in the to-be-desalinated area drops to a set value, closing the auxiliary heating evaporation system;

S5, sampling and measuring whether salinity of the soil of the to-be-desalinated area has reached a target value; when the target value is not reached, performing the following step S6; when the target value is reached, performing the following step S7;

S6, replacing and washing the desalination fabric, removing the auxiliary heating circulation pipeline; then, returning to the above step S1;

S7, removing the soil desalination and salt control apparatus for the bank of the lake reservoir; and S8, spreading and compacting the topsoil of the to-be-desalinated area in situ.

The soil desalination and salt control apparatus and method for a bank of a lake reservoir of the present disclosure has the following advantages.

The present disclosure implements washing and auxiliary heating evaporation on the to-be-desalinated area successively through the soil washing system and the auxiliary heating evaporation system. It has the advantages of fast desalination speed, good salt control effect, no reagent addition, convenient construction, investment saving, and strong promotion. It is widely applicable to the desalination and salt control work of various high-salinity soil substrates on banks of lake reservoirs in coastal areas.

DETAILED DESCRIPTION

Figure 1:
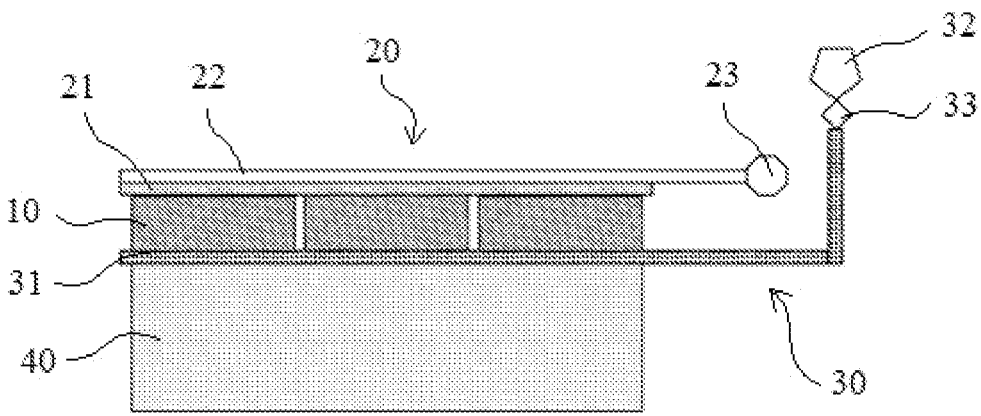
FIG. 1 is a schematic front view of a soil desalination and salt control apparatus for a bank of a lake reservoir according to the present disclosure.

The embodiments of the present disclosure are illustrated by the following specific examples, and those skilled in the art can easily understand other advantages and effects of the present disclosure from the content disclosed in this specification.

Please note that the structures, proportions, sizes, etc., depicted in the drawings are only intended to complement the content revealed in the specification for the understanding and reading of those familiar with this technology, and are not intended to define the limiting conditions for the implementation of the present disclosure. Therefore, they do not have substantial technical significance. Any modification of the structure, change in proportional relationships, or adjustment of size, as long as it does not affect the efficacy and objectives that the present disclosure can achieve, should still fall within the scope covered by the technical content disclosed by the present disclosure. At the same time, terms used in this specification such as "above," "below," "left," "right," "middle," and "one" are also merely for the sake of clear description and are not intended to limit the scope of implementation of the present disclosure. Changes or adjustments in their relative relationships, without substantial changes to the technical content, should also be considered within the implementable scope of the present disclosure.

It should also be noted that when a component is referred to as "fixed to" or "disposed on" another component, it can be directly on another component or may also be present on an intermediate component. When a component is said to be "connected" to another component, it can be directly connected to another component or it can also be indirectly connected to another component through an intermediate component.

Additionally, the descriptions involving "first," "second," and the like in the present disclosure are solely for descriptive purposes and should not be understood as indicating or implying their relative importance or as suggesting the number of technical features indicated. Therefore, the features defined as "first," "second" may explicitly or implicitly include at least one such feature. Furthermore, the technical solutions among various embodiments can be combined with each other, but such combinations must be based on what can be realized by those skilled in the art. When the combination of technical solutions results in contradictions or impossibilities, it should be considered that such a combination does not exist and is not within the scope of protection sought by the present disclosure.

Figure 2:
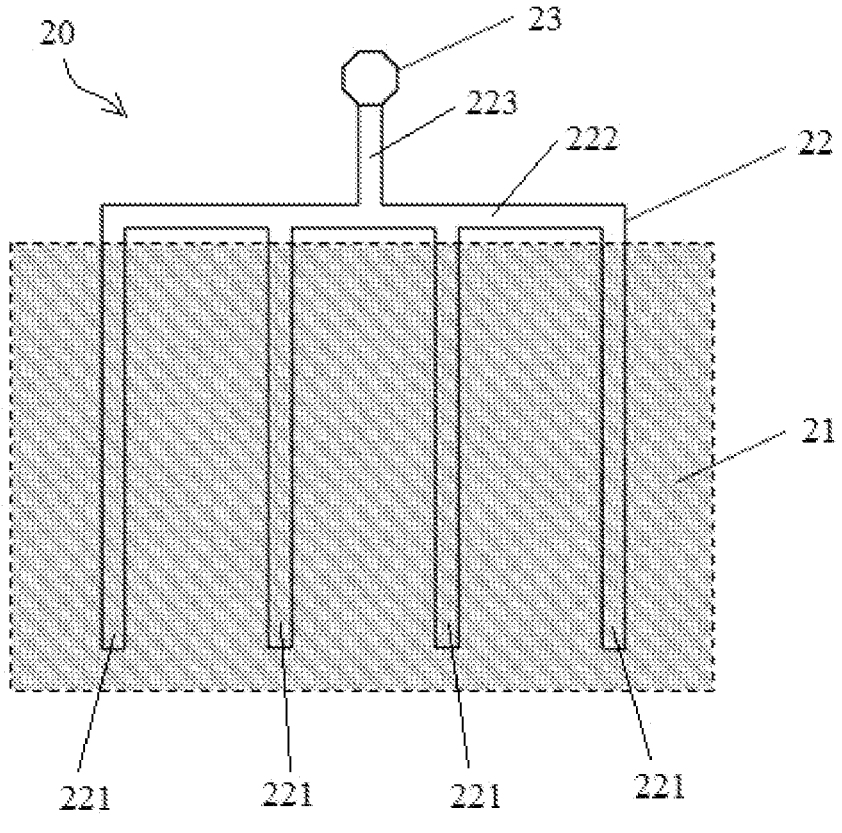
FIG. 2 is a schematic top view of a soil washing system according to the present disclosure.
Figure 3:
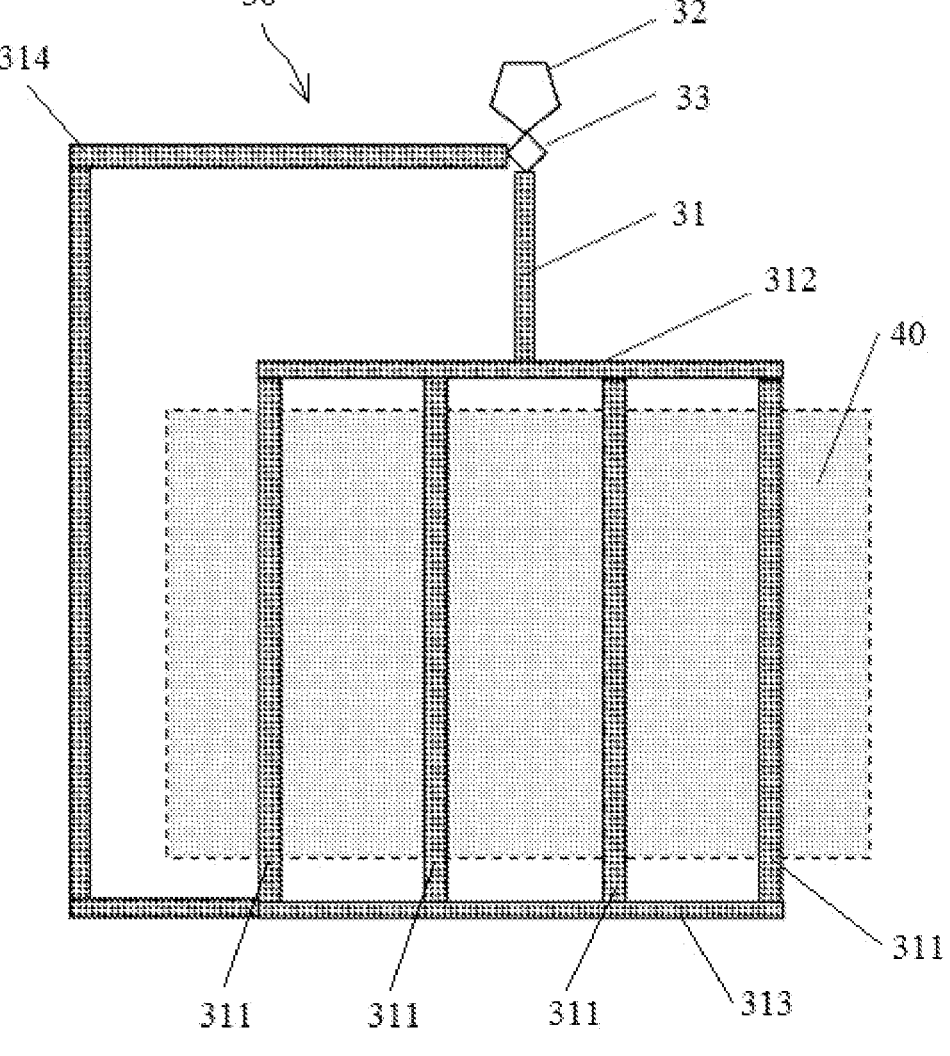
FIG. 3 is a schematic top view of an auxiliary heating evaporation system according to the present disclosure.

The present disclosure provides a soil desalination and salt control apparatus for a bank of a lake reservoir. As shown in FIG. 1, the apparatus of the present disclosure includes a soil washing system 20 and an auxiliary heating evaporation system 30. As shown in FIGS. 1 and 2, the soil washing system 20 includes a desalination fabric 21 laid on the surface of the soil in the to-be-desalinated area, a washing pipeline 22 disposed on the desalination fabric 21, and a washing water source connected to the washing pipeline 22. The washing water source is used to introduce a washing medium into the washing pipeline 22; in this embodiment, the washing medium is water, and multiple washing holes are arranged on the lower end side of the washing pipeline 22, facing towards of the desalination fabric 21. As shown in FIGS. 1 and 3, the auxiliary heating evaporation system 30 includes an auxiliary heating circulation pipeline 31 buried inside the soil of the to-be-desalinated area, as well as a heat source assembly 32 and an auxiliary heating control system 33, both connected to the auxiliary heating circulation pipeline 31. The heat source assembly 32 is used to introduce a heat medium into the auxiliary heating circulation pipeline 31; in this embodiment, the heat medium is hot water. Additionally, the burial depth of the auxiliary heating circulation pipeline 31 is the desalination control depth of soil of the bank of the lake reservoir, which is also calculated as the elevation of the top of the auxiliary heating circulation pipeline 31.

Figure 4:
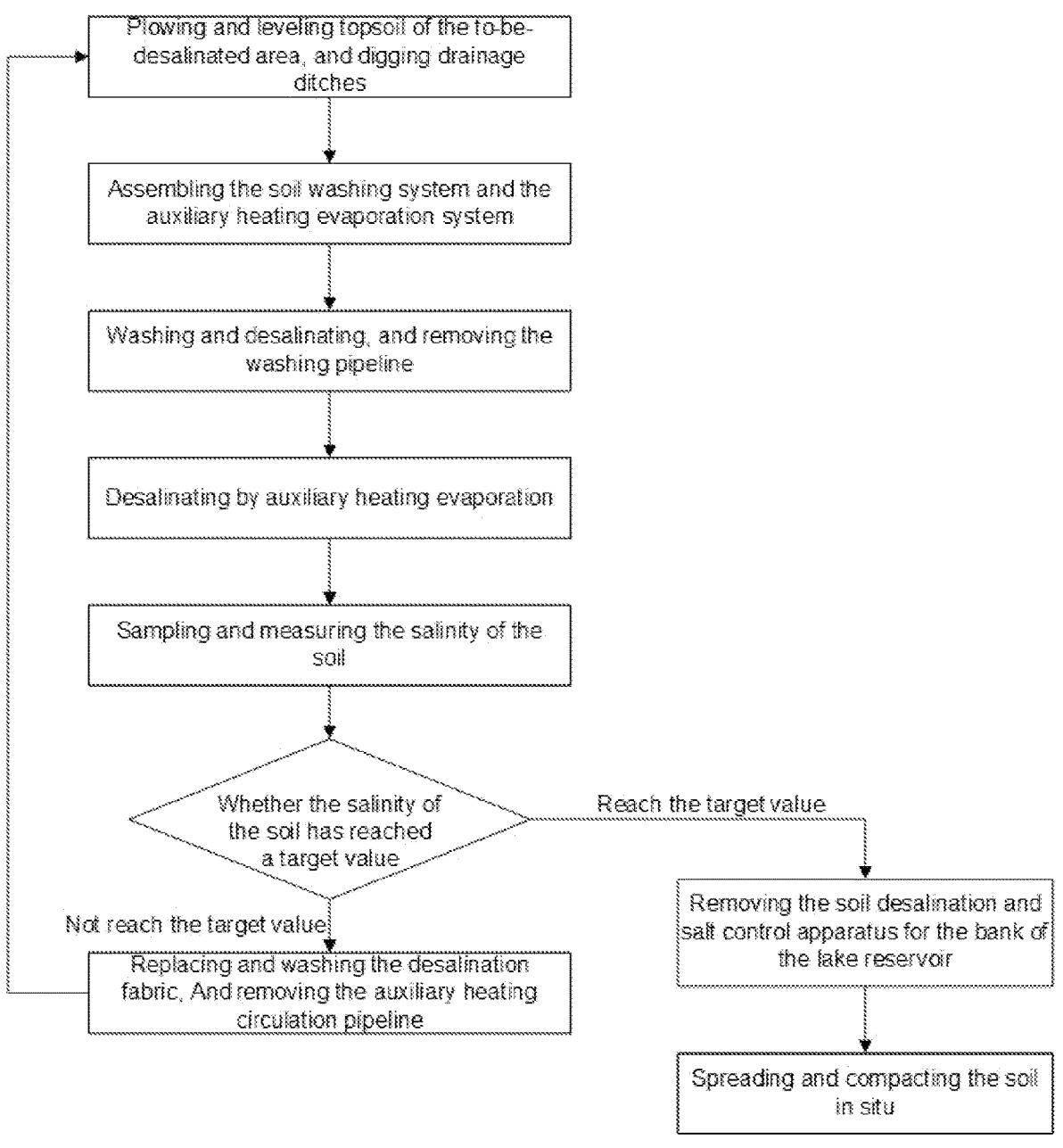
FIG. 4 is a flowchart of a soil desalination and salt control method for a bank of a lake reservoir according to the present disclosure.

The present disclosure further provides a soil desalination and salt control method for a bank of a lake reservoir using the above apparatus. As shown in FIG. 4, the method includes the following operations.

S1, the topsoil of the to-be-desalinated area 10 is plowed and leveled according to the preset desalination control depth of the soil of the bank of the lake reservoir, and forming multiple interconnected drainage ditches on the topsoil of the to-be-desalinated area 10. By plowing and leveling the topsoil of the to-be-desalinated area 10, the subsequent washing effect and auxiliary heating evaporation effect on the soil of the area can be improved, which is also conducive to enhancing the efficiency of desalination and salt control. Moreover, when plowing and leveling the topsoil of the to-be-desalinated area 10, drainage ditches can be formed by the terrain of the bank of the lake reservoir, allowing the washing medium to naturally flow along the gradient of the bank of the lake reservoir, which is beneficial for the subsequent washing and drainage during the washing. The desalination control depth of the soil of the bank of the lake reservoir, which is also the desalination control depth, is set according to requirements, with a preferred range of 20 to 50 cm.

S2, the soil washing system 20 and the auxiliary heating evaporation system 30 are assembled in the to-be-desalinated area 10, the auxiliary heating circulation pipe 31 is buried inside the soil of the to-be-desalinated area 10 so that the top of the auxiliary heating circulation pipe 31 is flush with the bottom of the drainage ditches; the desalination fabric 21 is laid on the surface of the soil in the to-be-desalinated area 10, and the washing pipe 22 is disposed on the desalination fabric 21.

S3, the soil washing system 20 is started. Specifically, the washing water source introduces water into the washing pipeline 22, and the water flows into the to-be-desalinated area 10 through multiple washing holes and the desalination fabric 21. According to the set water distribution flow rate, the to-be-desalinated area 10 is subjected to a fixed duration of uninterrupted washing to achieve desalination. The washing duration can be adjusted according to the specific conditions of the soil, preferably between 48 to 480 hours, with the trend of chloride ion concentration in the drainage as a reference. The water distribution flow rate is set according to requirements, preferably 5 to 10 L/(m²·h). The water quality of the washing water source should meet certain chloride ion concentration requirements. After the washing is finished, the soil washing system 20 is closed, and the washing pipeline 22 is removed, then only the desalination fabric 21 remains on the surface of the soil in the to-be-desalinated area 10.

S4, the auxiliary heating evaporation system 30 is started. Specifically, the heat source assembly 32 introduces a heat medium into the auxiliary heating circulation pipeline 31, the heat medium circulates and flows within the auxiliary heating circulation pipeline 31, auxiliary heating evaporation is implemented in the to-be-desalinated area 10, and the auxiliary heating control system 33 controls the flow rate of the heat medium in the auxiliary heating circulation pipeline 31, as well as the circulation flow of the heat medium in the auxiliary heating circulation pipeline 31. When the soil moisture content in the to-be-desalinated area 10 drops to the set value, the auxiliary heating evaporation system 30 is closed. Preferably, the auxiliary heating evaporation system 30 is closed when the soil moisture content of the to-be-desalinated area 10 drops to 20% to 40%.

S5, the soil of the to-be-desalinated area 10 is sampled to measure whether the salinity has reached the target value, which is set according to the requirements; when the target value is not reached, the following step S6 is performed; when the target value is reached, the following step S7 is performed.

S6, the desalination fabric 21 is replaced and washed, the auxiliary heating circulation pipe 31 is removed; then, the above step S1 is re-performed, that is, the topsoil of the to-be-desalinated area 10 is plowed and leveled again, then the soil washing system 20 is reassembled in the to-be-desalinated area 10, and the to-be-desalinated area 10 is subjected to the washing and auxiliary heating evaporation again, until the measured salinity of the sampled soil reaches the target value.

S7, the soil desalination and salt control apparatus for the bank of the lake reservoir is removed.

S8, the topsoil of the to-be-desalinated area 10 is spread and compacted in situ.

Therefore, the present disclosure implements washing and auxiliary heating evaporation on the to-be-desalinated area 10 successively through the soil washing system 20 and the auxiliary heating evaporation system 30, effectively reducing the soil salinity of the to-be-desalinated area 10, and being well suited for desalination and salt control work of various high-salinity soil substrates on banks of lake reservoirs in coastal areas. In particular, desalination and salt control are achieved through the washing and auxiliary heating evaporation, which have the advantages of fast desalination speed, good salt control effect, no addition of reagents, convenient construction, investment saving, and strong promotion, reflecting the concepts of ecology and environmental protection, and low carbon. It is economical, practical, and widely applicable, and is especially suitable for promotion and use in banks of lakes reservoirs in coastal areas where the soil salinity is high, the permeability coefficient is small, and the bank ratio is not greater than 1:15.

Furthermore, as shown in FIG. 2, the soil washing system 20 further includes a water diversion assembly 23, where the washing pipeline 22 is connected to the washing water source through the water diversion assembly 23. In practical applications, the washing pipeline 22 can have various arrangements; in this embodiment, the washing pipeline 22 includes multiple parallel washing branch pipelines 221, a first main pipeline 222 connected to one end of each of the multiple washing branch pipelines 221, and a second main pipeline 223 connected to the first main pipeline 222. The other end of each of the multiple washing branch pipelines 221 is blocked, and all the washing branch pipelines 221 are located on the upper side of the desalination fabric 21. Each washing branch pipeline 221 has multiple washing holes. The second main pipeline 223 is detachably connected to the water diversion assembly 23, facilitating the assembly of the soil washing system 20. The first main pipeline 222 is perpendicular to the washing branch pipelines 221, and the second main pipeline 223 is parallel to the washing branch pipelines 221.

Preferably, in this embodiment, the apertures of the washing holes on the washing branch pipelines 221 are 4 mm, and the spacing between two adjacent washing holes is 40 cm; the desalination fabric 21 is a geotextile of 100 m in length and 25 m in width; in the washing pipeline 22, the diameter of each washing branch pipeline 221 is DN15, and the diameters of both the first main pipeline 222 and the second main pipeline 223 are DN80.

Furthermore, in practical applications, the auxiliary heating circulation pipeline 31 can have various arrangements. In this embodiment, as shown in FIG. 3, the auxiliary heating circulation pipeline 31 includes multiple evaporative branch pipelines 311 arranged side by side, a first auxiliary heating main pipeline 312 connected to one end of each of the multiple evaporative branch pipelines 311, a second auxiliary heating main pipeline 313 connected to the other end of each of the multiple evaporative branch pipelines 311, and an auxiliary heating connection pipeline 314 connected between the first auxiliary heating main pipeline 312 and the second auxiliary heating main pipeline 313. The multiple evaporative branch pipelines 311 are all buried within the soil of the to-be-desalinated area 10, and the auxiliary heating connection pipeline 314 is detachably connected with the heat source assembly 32 and the auxiliary heating control system 33. The evaporative branch pipelines 311 are perpendicular to the first auxiliary heating main pipeline 312, and the evaporative branch pipelines 311 are perpendicular to the second auxiliary heating main pipeline 313.

Preferably, the heat source assembly 32 is a water heating and storing tank, which can be a tank heated by either solar or electricity. The type of heat source assembly 32 can be selected based on conditions such as illumination, electrical power supply, and energy consumption demand.

Furthermore, the soil desalination and salt control apparatus for the bank of the lake reservoir further includes a thermal insulation pad layer, which is laid between the auxiliary heating circulation pipe 31 and a bottom soil layer 40 of the to-be-desalinated area 10, reducing unnecessary heat dissipation during auxiliary heating evaporation.

In summary, the desalination and salt control process of the soil desalination and salt control apparatus for the bank of the lake reservoir with the above structure is as follows.

Figure 5:
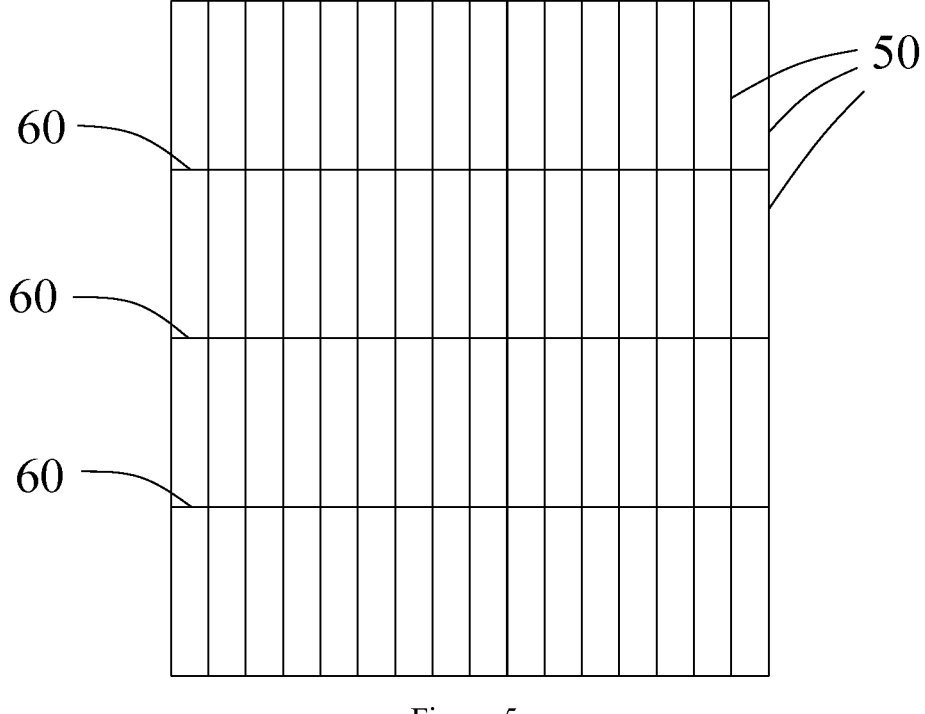
FIG. 5 is a schematic top view of a drainage ditch formed on topsoil of a to-be-desalinated area according to the present disclosure.

I. The topsoil in the to-be-desalinated area 10 is plowed and leveled according to a desalination control depth of 30 cm, and multiple interconnected drainage ditches are formed on the topsoil of the to-be-desalinated area 10. As shown in FIG. 5, the drainage ditches include multiple transverse drainage ditches 50, as well as multiple longitudinal drainage ditches 60, both of which are formed on the bank surface of the lake reservoir. The transverse drainage ditches 50 extend laterally along the direction parallel to the baseline of the bank on the bank surface, and the spacing between two adjacent transverse drainage ditches 50 ranges from 0.5 m to 3 m, preferably 2 m. The longitudinal drainage ditches 60 extend longitudinally along the direction perpendicular to the baseline of the bank on the bank surface, that is, along the inclined direction of the bank surface, and the spacing between two adjacent longitudinal drainage ditches 60 ranges from 10 m to 50 m, preferably 20 m. The specifications for each transverse drainage ditch 50 and each longitudinal drainage ditch 60 are as follows: the ditch width is 30 cm, and the ditch depth is 30 cm.

II. The auxiliary heating circulation pipeline 31 is buried inside the soil of the to-be-desalinated area 10, and the auxiliary heating evaporation system 30 is assembled; the desalination fabric 21 and the washing pipeline 22 are laid on the surface of the soil in the to-be-desalinated area 10 in turn, and the soil washing system 20 is assembled.

III. The soil washing system 20 is started, and a continuous washing for 480 hours in real-time is carried out on the to-be-desalinated area 10. The water distribution flow rate is controlled at 5 L/(m²·h), and the chloride ion concentration of the washing water source is no greater than 200 mg/L to achieve desalination by washing. After completing the set washing duration, the soil washing system 20 is closed, the washing pipeline 22 is removed, and only the desalination fabric 21 is kept.

IV. The auxiliary heating evaporation system 30 is started to carry out auxiliary heating evaporation on the to-be-desalinated area 10. When the soil moisture content of the to-be-desalinated area 10 drops below 30%, the auxiliary heating evaporation system 30 is turned off.

V. The soil of the to-be-desalinated area 10 is sampled to measure whether the salinity is no greater than 0.4%. If the standard is met, the soil desalination and salt control apparatus for the bank of the lake reservoir is removed, and the topsoil of the to-be-desalinated area 10 is spread and compacted in situ; if the standard is not met, the desalination fabric 21 is replaced and washed, the auxiliary heating circulation pipeline 31 is removed, the topsoil of the to-be-desalinated area 10 is plowed and leveled again, and the drainage ditches are dug, then the soil washing system 20 is reassembled in the to-be-desalinated area 10, and the to-be-desalinated area 10 is subjected to the washing and auxiliary heating evaporation again, until the measured salinity of the sampled soil is no greater than 0.4%.

In the above-mentioned desalination and salt control process, the start and stop of the soil washing system 20 and the auxiliary heating evaporation system 30 can be reasonably arranged according to the precipitation forecast combined with the weather forecast; after the soil desalination is completed, the soil can also be transported to a designated area and spread and compacted to the required thickness.

In summary, the present disclosure effectively overcomes various shortcomings in the existing technology and has high industrial application value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

The invention claimed is:

1. A soil desalination and salt control apparatus for a bank of a lake reservoir, comprising a soil washing system (20) and an auxiliary heating evaporation system (30);

wherein the soil washing system (20) comprises a desalination fabric (21) laid on a surface of soil in a to-be-desalinated area (10), a washing pipeline (22) set on the desalination fabric (21), and a washing water source connected to the washing pipeline (22), wherein a plurality of washing holes is arranged on a lower end side of the washing pipeline (22), facing towards the desalination fabric (21);

wherein the auxiliary heating evaporation system (30) comprises an auxiliary heating circulation pipeline (31) buried inside the soil of the to-be-desalinated area (10), as well as a heat source assembly (32) and an auxiliary heating control system (33) both connected to the auxiliary heating circulation pipeline (31), wherein a burial depth of the auxiliary heating circulation pipeline (31) is a desalination control depth of soil of the bank of the lake reservoir.

2. The soil desalination and salt control apparatus for the bank of the lake reservoir according to claim 1, wherein the soil washing system (20) further comprises a water diversion assembly (23), wherein the washing pipeline (22) is connected to the washing water source through the water diversion assembly (23).

3. The soil desalination and salt control apparatus for the bank of the lake reservoir according to claim 2, wherein the washing pipeline (22) comprises a plurality of parallel washing branch pipelines (221), a first main pipeline (222) connected to one end of each of the plurality of washing branch pipelines (221), and a second main pipeline (223) connected to the first main pipeline (222); wherein the plurality of washing branch pipelines (221) is located on an upper side of the desalination fabric (21), and each of the plurality of washing branch pipelines (221) is provided with the plurality of washing holes; wherein the second main pipeline (223) is detachably connected to the water diversion assembly (23).

4. The soil desalination and salt control apparatus for the bank of the lake reservoir according to claim 1, wherein the auxiliary heating circulation pipeline (31) comprises a plurality of evaporative branch pipelines (311) arranged side by side, a first auxiliary heating main pipeline (312) connected to one end of each of the plurality of evaporative branch pipelines (311), a second auxiliary heating main pipeline (313) connected to the other end of each of the plurality of evaporative branch pipelines (311), and an auxiliary heating connection pipeline (314) connected between the first auxiliary heating main pipeline (312) and the second auxiliary heating main pipeline (313); wherein the plurality of evaporative branch pipelines (311) is buried within the soil of the to-be-desalinated area (10), and the auxiliary heating connection pipeline (314) is detachably connected with the heat source assembly (32) and the auxiliary heating control system (33).

5. The soil desalination and salt control apparatus for the bank of the lake reservoir according to claim 1, wherein the heat source assembly (32) is a water heating and storing tank.

6. The soil desalination and salt control apparatus for the bank of the lake reservoir according to claim 1, further comprising a thermal insulation pad layer laid between the auxiliary heating circulation pipeline (31) and a bottom soil layer (40) of the to-be-desalinated area (10).

7. A soil desalination and salt control method for a bank of a lake reservoir, using the soil desalination and salt control apparatus according to claim 1, wherein the method comprises:

S1, plowing and leveling topsoil of the to-be-desalinated area (10) according to a preset desalination control depth of the soil of the bank of the lake reservoir, and forming a plurality of interconnected drainage ditches on the topsoil of the to-be-desalinated area (10);

S2, assembling the soil washing system (20) and the auxiliary heating evaporation system (30) in the to-be-desalinated area (10), burying the auxiliary heating circulation pipeline (31) inside the soil of the to-be-desalinated area (10) so that a top of the auxiliary heating circulation pipeline (31) is flush with a bottom of the plurality of drainage ditches; laying the desalination fabric (21) on a surface of the soil in the to-be-desalinated area (10), and disposing the washing pipe (22) on the desalination fabric (21);

S3, starting the soil washing system (20): introducing water into the washing pipeline (22) by the washing water source, wherein the water flows into the to-be-desalinated area (10) through the plurality of washing holes and the desalination fabric (21), and implementing uninterrupted washing for a fixed duration on the to-be-desalinated area (10) according to a set water distribution flow rate; after the washing is finished, closing the soil washing system (20), and removing the washing pipeline (22);

S4, starting the auxiliary heating evaporation system (30): introducing a heat medium into the auxiliary heating circulation pipeline (31) by the heat source assembly (32), wherein the heat medium circulates and flows within the auxiliary heating circulation pipeline (31), and implementing auxiliary heating evaporation on the to-be-desalinated area (10); when a soil moisture content in the to-be-desalinated area (10) drops to a set value, closing the auxiliary heating evaporation system (30);

S5, sampling and measuring whether salinity of the soil of the to-be-desalinated area (10) has reached a target value; when the target value is not reached, performing the following step S6; when the target value is reached, performing the following step S7;

S6, replacing and washing the desalination fabric (21), removing the auxiliary heating circulation pipeline (31); then, returning to the above step S1;

S7, removing the soil desalination and salt control apparatus for the bank of the lake reservoir; and S8, spreading and compacting the topsoil of the to-be-desalinated area (10) in situ.

\* \* \* \* \*